United States Patent [19]

Caspers et al.

[11] Patent Number: 5,127,716
[45] Date of Patent: Jul. 7, 1992

[54] MAGAZINE AND DRAWER FOR ACCOMODATING DISK-SHAPED MEDIA

[75] Inventors: Johannes Caspers, Villingen-Schwenningen; Erich Geiger, Unterkirnach, both of Fed. Rep. of Germany

[73] Assignee: Deutsche Thomson-Brandt GmbH, Villingen-Schwenningen, Fed. Rep. of Germany

[21] Appl. No.: 572,338

[22] Filed: Aug. 23, 1990

Related U.S. Application Data

[63] Continuation of Ser. No. 351,318, May 10, 1989, abandoned, which is a continuation of Ser. No. 235,653, Aug. 24, 1988, abandoned.

[30] Foreign Application Priority Data

Aug. 27, 1987 [DE] Fed. Rep. of Germany ....... 3728588

[51] Int. Cl.$^5$ ............................................. A47B 47/02
[52] U.S. Cl. .................................................. 312/9.48
[58] Field of Search ................................. 312/286, 287

[56] References Cited

U.S. PATENT DOCUMENTS

| | | | |
|---|---|---|---|
| 2,628,145 | 2/1953 | Slattery | 312/12 X |
| 4,266,834 | 5/1981 | Ackeret | 206/387 X |
| 4,489,994 | 12/1984 | Williams | 312/119 |
| 4,811,995 | 3/1989 | Ackeret | 312/12 |

Primary Examiner—Joseph Falk
Attorney, Agent, or Firm—Max Fogiel

[57] ABSTRACT

A compact disc player arrangement in which compact discs are stored in a magazine housing. One above another in a stack. The magazine housing may be removed for the purpose of loading with compact discs, and this magazine housing is replaceable in the compact disc player after having been loaded. A slidable drawer that is movable into and out of the housing forms a single component or unit with the housing. A selected compact disc that is different from the disc stored in the magazine housing, may be held in the slidable drawer and played in any selected sequence, independent of the discs stored in the magazine housing. The arrangement allows compact disc players to be extended from the use of only one-disc-at-a-time devices.

4 Claims, 2 Drawing Sheets

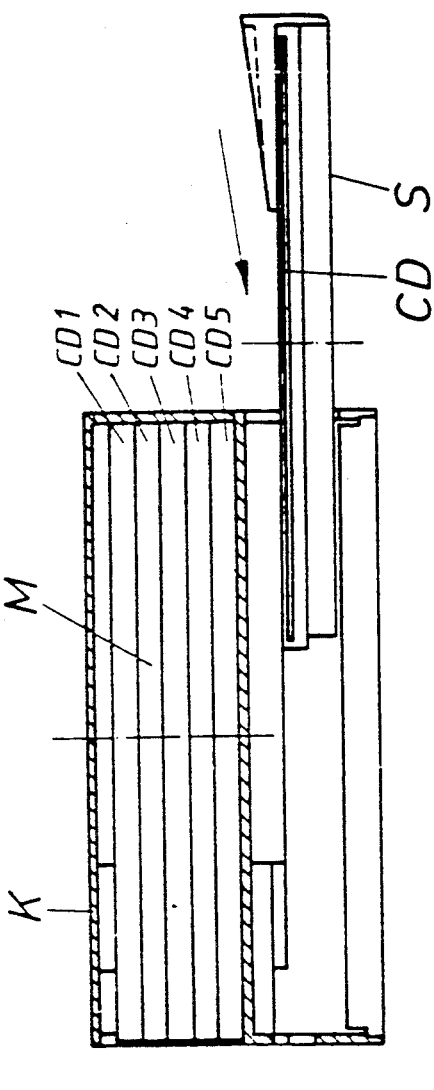
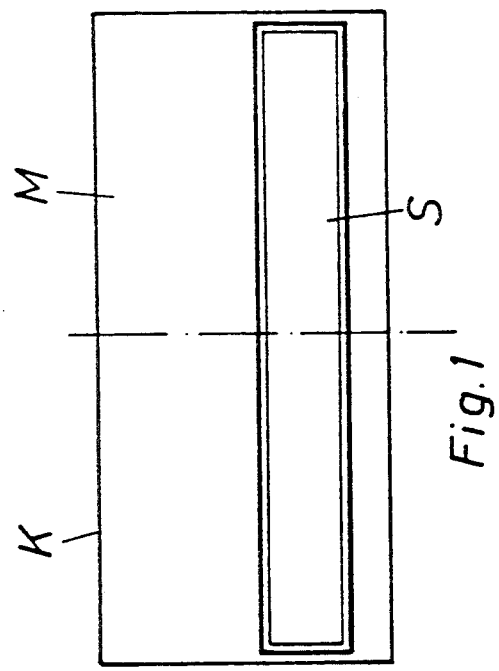
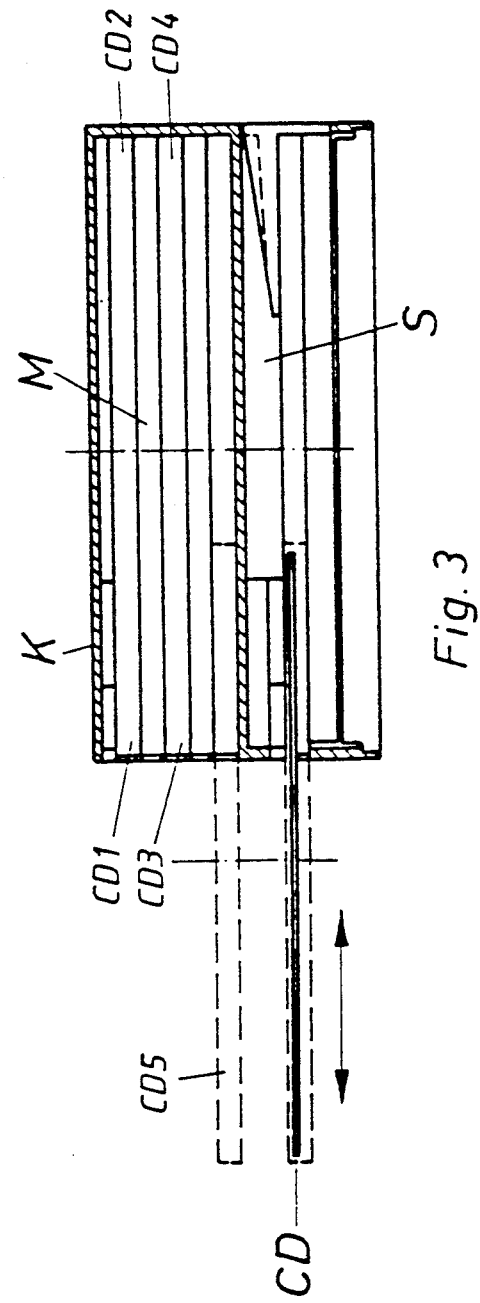

MAGAZINE AND DRAWER FOR ACCOMODATING DISK-SHAPED MEDIA

The present application is a continuation of the parent application Ser. No. 351,318 filed May 10, 1989, now abandoned which is a continuation of Ser. No. 235,653 filed Aug. 24, 1988, now abandoned.

BACKGROUND OF THE INVENTION

The invention concerns a magazine and a drawer for accommodating disk-shaped recording media in recording and/or playback equipment.

Simple compact-disk players to not have a magazine for accommodating several compact disks. They only have a drawer for accommodating one compact disk that can be pulled forward and pushed back in, making it possible to insert and remove a disk. Devices that are strictly changer-type players and have a magazine but no drawer are also known. These entail the drawback that they can only be operated in the capacity of changer-type players. There do exist, however, compactdisk players that can be used with a magazine instead of a drawer. These devices in turn entail the drawback that they can be operated either only as one-disk-at-a-time players or as changer-type players. To eliminate these drawbacks, the more expensive compact-disk players have both a drawer and a magazine. The drawback of these devices is that the magazine and drawer take up a lot of space.

SUMMARY OF THE INVENTION

The object of the invention is accordingly to provide a magazine and drawer that will not take up much space in a compact-disk player that can be operated either as a one-disk-at-a-time player or as a changer-type player.

This object is attained in accordance with the invention in that the magazine and drawer are combined into a single component.

BRIEF DESCRIPTION OF THE DRAWINGS

FIG. 1 illustrates the front of a combination magazine and drawer;

FIGS. 2 and 3 are longitudinal sections through the combination magazine and drawer;

DESCRIPTION OF THE PREFERRED EMBODIMENTS

Figure 4:
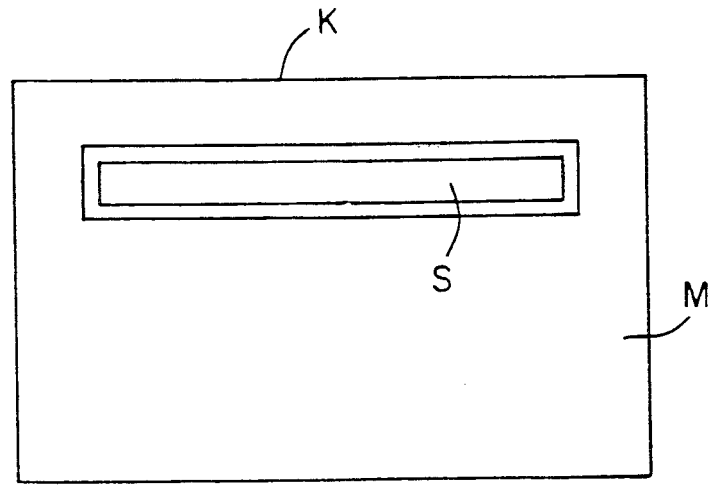
FIG. 4 is a front view of a combination in which the magazine is below the drawer.
Figure 5:
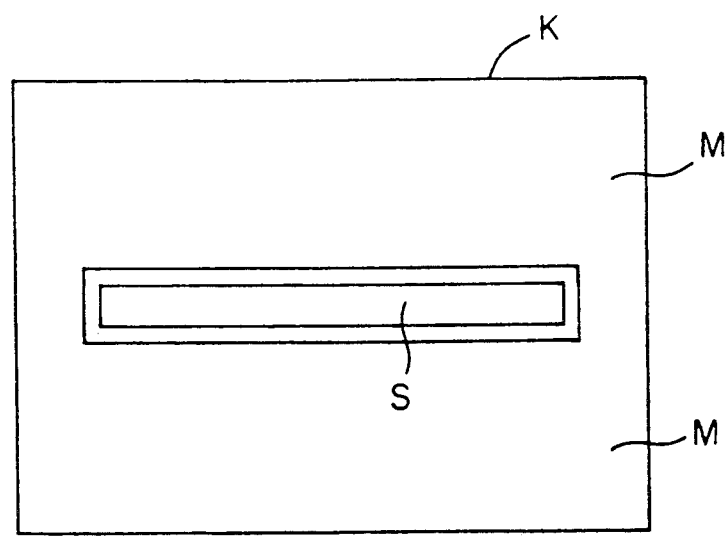
FIG. 5 is a front view of a combination in which the magazine is in two parts.

FIG. 1 illustrates the front; F of a combination K magazine M and drawer S. Magazine M is on top of drawer S. It could, however, also be under drawer S. The magazine may also be in two parts, with the drawer between them.

The longitudinal section in FIG. 2 shows a magazine M for five compact disks CD1 to CD 5 positioned on top of drawer S. Drawer S, which contains one compact disk, has been pulled forward.

The drawer in the combination magazine M and drawer S illustrated in the longitudinal section in FIG. 3 is inside, and compact disk CD is in the playing position. The playing position for the lowest compact disk CD5 in magazine M is represented by the broken lines above compact disk CD.

Since the magazine and drawer are combined into one component, they occupy essentially less space than they would if they were separate components. They are also easier to manufacture in the form of one component because fewer tools and less material is needed. Components that are combined into one are also cheaper to manufacture because there is no need for the additional assembly operation required with two components.

The invention is appropriate for compact-disk players, videodisc players, draw-disk players and magnetic-optical equipment.

We claim:

1. An arrangement for a compact disc player comprising: a magazine with a housing for storing a plurality of compact discs to be played; said compact discs being stored one above another in a stack of compact discs within said magazine housing; a slidable drawer movable into and out of said housing for receiving a selected compact disc to be played; said magazine housing having a backside with an opening for each compact disc stored in said magazine housing; said housing having a front side, said slidable drawer being slidable through an opening in said front side of said magazine housing, the backside of said housing including an opening for a compact disc in said slidable drawer, said opening in said front side of said magazine housing being the only opening on said front side.

2. An arrangement for a compact disc player comprising: a magazine with a housing for storing a plurality of compact discs to be played; said compact discs being stored one above another in a stack of compact discs within said magazine housing; said magazine housing being removable from said player to load said magazine housing by inserting compact discs thereinto, said magazine housing being replaceable in said player after being loaded to be part of said compact disc player; a slidable drawer movable into and out of said housing for receiving a selected compact disc to be played; said selected compact disc may be different from the discs stored in said magazine housing, said selected compact disc being insertable into said drawer and being playable in any selected sequence independent of the discs stored in said housing; said selected compact disc and said compact discs stored in said magazine housing being playable selectively by said compact disc player; said magazine housing and said drawer comprising a single component; said magazine housing and said slidable drawer being adapted to hold only compact discs; said magazine housing having a backside with an opening for each compact disc stored in said magazine housing; said housing having a front side, said slidable drawer being slidable through an opening in said front side of said magazine housing, the backside of said housing including an opening for a compact disc in said slidable drawer, said opening in said front side of said magazine housing being the only opening on said front side.

3. An arrangement as defined in claim 1, wherein said magazine is above said slidable drawer.

4. An arrangement as defined in claim 1, wherein said magazine is located below said slidable drawer.

* * * * *